US008219280B2

(12) United States Patent
Ishikawa

(10) Patent No.: US 8,219,280 B2
(45) Date of Patent: Jul. 10, 2012

(54) VEHICLE INFORMATION STORAGE APPARATUS

(75) Inventor: Tomoyasu Ishikawa, Nagoya (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 99 days.

(21) Appl. No.: 12/741,547

(22) PCT Filed: Dec. 4, 2008

(86) PCT No.: PCT/JP2008/072579

§ 371 (c)(1), (2), (4) Date: May 5, 2010

(87) PCT Pub. No.: WO2009/075338

PCT Pub. Date: Jun. 18, 2009

(65) Prior Publication Data

US 2010/0268415 A1 Oct. 21, 2010

(30) Foreign Application Priority Data

Dec. 12, 2007 (JP) ................................ 2007-320992

(51) Int. Cl.
*G01M 17/00* (2006.01)
*B60K 1/00* (2006.01)

(52) U.S. Cl. ...................................... 701/34.4; 180/65.8

(58) Field of Classification Search .................... 701/29, 701/35, 33, 30, 32; 180/65.8, 65.21, 65.22; 714/25, 42; 455/556.1, 414.1; 340/438; 705/305
See application file for complete search history.

(56) References Cited

U.S. PATENT DOCUMENTS

| | | | | |
|---|---|---|---|---|
| 5,477,141 | A | 12/1995 | Nather et al. | |
| 6,601,015 | B1 | 7/2003 | Milvert et al. | |
| 6,615,119 | B1 * | 9/2003 | Shimizu | 701/31.6 |
| 2008/0077299 | A1 * | 3/2008 | Arshad et al. | 701/50 |
| 2008/0262674 | A1 | 10/2008 | Lindinger et al. | |

FOREIGN PATENT DOCUMENTS

| | | | |
|---|---|---|---|
| DE | 100 29 401 | A1 | 12/2001 |
| DE | 10 2005 044 703 | A1 | 3/2007 |
| EP | 0 572 840 | A2 | 12/1993 |
| EP | 0 871 147 | A2 | 10/1998 |
| JP | 09-126954 | A | 5/1997 |
| JP | 2000-097810 | A | 4/2000 |
| JP | 2002-014839 | A | 1/2002 |
| JP | 2003-084998 | A | 3/2003 |
| JP | 2005-043138 | A | 2/2005 |
| JP | 2006-023850 | A | 1/2006 |
| JP | 2006-142908 | A | 6/2006 |
| JP | 2007-062632 | A | 3/2007 |

OTHER PUBLICATIONS

Japanese Office Action issued in Japanese Application No. 2007-320992 dated May 24, 2011.

* cited by examiner

*Primary Examiner* — James Trammell
*Assistant Examiner* — Muhammad Shafi
(74) *Attorney, Agent, or Firm* — Sughrue Mion, PLLC

(57) ABSTRACT

A vehicle information storage apparatus capable of storing necessary information dataset helpful for diagnosis. The vehicle information storage apparatus includes a status information acquiring unit acquiring a dataset of status information items of a vehicle; and a controlling unit determining a time point when the malfunction started based on the dataset of status information items acquired by the status information acquiring unit, and further determines the malfunction-cause-investigation information data to be used for investigating the cause of the malfunction from among the dataset of status information items acquired by the status information acquiring unit based on the specified time point when the malfunction started, and stores the determined malfunction-cause-investigation information data in a prescribed storage medium.

6 Claims, 4 Drawing Sheets

FIG.3

24C

| DTC | CRITERIA FOR DETERMINING WHETHER MALFUNCTION STARTED (PRESCRIBED TIME PERIOD) | RANGE OF MALFUNCTION-CAUSE-INVESTIGATION INFORMATION DATA |
|---|---|---|
| 1 | SAME STATUS CONTINUES FOR 1.0 [SEC] | FROM 1.0 [SEC] BEFORE TO 0.5 [SEC] AFTER MALFUNCTION STARTED |
| 2 | SAME STATUS CONTINUES FOR 3.0 [SEC] | FROM 1.5 [SEC] BEFORE TO 0.5 [SEC] AFTER MALFUNCTION STARTED |
| 3 | SAME STATUS CONTINUES FOR 1.5 [SEC] | FROM 1.0 [SEC] BEFORE TO 1.0 [SEC] AFTER MALFUNCTION STARTED |
| ⋮ | ⋮ | ⋮ |

VEHICLE INFORMATION STORAGE APPARATUS

TECHNICAL FIELD

The present invention generally relates to a vehicle information storage apparatus capable of storing data of information items indicating the status of a vehicle (including the in-vehicle equipment of the vehicle) when a malfunction is detected in the vehicle so that the stored data of the information items could help in investigating the cause of the malfunction.

BACKGROUND ART

Conventionally, the data of the information items indicating the status of the vehicle (including the in-vehicle equipment of the vehicle, hereinafter collectively referred to as "a vehicle") have been monitored in a vehicle. Further, when a malfunction is detected in the vehicle, the data of the information items indicating the status of the vehicle are stored into a non-volatile storage medium or the like. Then, the data of the information items stored in the non-volatile storage medium or the like are used for the investigation of the cause of the malfunction. Such a process of investigating the cause of the malfunction may be called a diagnosis. It should be noted that a controlling device in the vehicle may be configure to store the data of the information items for the diagnosis while performing other vehicle control processes.

For example, Patent Document 1 discloses a vehicle information terminal apparatus capable of storing information items into a storage device for the diagnosis. The vehicle information terminal apparatus includes one or more vehicle electronic control devices, sensors, storage devices, and internal memories. The electronic control device includes a vehicle control program and a diagnosis program for diagnosing the status of the vehicle. The sensors acquire the data of status information items indicating the status of the vehicle (herein "vehicle information" in this paragraph). The vehicle information acquired from the vehicle electronic control device and sensors and a result of the diagnosis obtained by executing the diagnosis program are sequentially stored into the internal memory. Then, in a case where a malfunction is detected in the vehicle based on the result of the diagnosis, the vehicle information stored within a specific range in the internal memory are copied into the storage device, the specific range being determined as a predetermined time period until the malfunction is detected.

Patent Document 1: Japanese Patent Application Publication No. 2005-43138

DISCLOSURE OF THE INVENTION

Problem to be Solved by the Invention

In a conventional apparatus as described above, the vehicle copies and stores the "vehicle information stored within the specific range determined as a predetermined time period until the malfunction is detected." into the storage device. However, unfortunately, in many cases, the more important information dataset for the diagnosis process is not the information dataset stored before and after the malfunction was "detected" but the information dataset stored before and after the malfunction "started". Further, in many cases, a malfunction may not be detected until after a certain period of time (elapsed time) has passed since the malfunction started. Due to this situation, in a conventional apparatus as described above, intrinsically unnecessary information dataset from the time when a malfunction started (or the time when after a certain period of time has passed since the malfunction started) to the time when the malfunction was detected is stored into the storage device. As a result, a storage capacity for storing the intrinsically unnecessary information dataset may become necessary. Further, when the time period in a "range determined as a predetermined time period until the malfunction is detected" is not sufficiently long, necessary information before and after the malfunction started may not be stored into the storage device.

The present invention is made in light of the above circumstance, and may provide a vehicle information storage apparatus capable of storing necessary information to help for the diagnosis.

Means for Solving Problem

According to an aspect of the present invention, a vehicle information storage apparatus includes a status information acquiring unit acquiring a dataset of status information items of a vehicle; a controlling unit determining malfunction-cause-investigation information data to be used for investigating a cause of a malfunction based on the dataset of information items acquired by the status information acquiring unit, and storing the determined malfunction-cause-investigation information data in a prescribed storage medium; and a malfunction-cause-investigation information range determination table storage unit storing a malfunction-cause-investigation information range determination table describing a range of malfunction-cause-investigation information data specified based on when the malfunction started, the range being determined based on the dataset of status information items acquired by the status information acquiring unit. In the vehicle information storage apparatus, the controlling unit determines a time point when the malfunction started in the vehicle based on the dataset of status information items acquired by the status information acquiring unit, and further determines the malfunction-cause-investigation information data to be used for investigating the cause of the malfunction from among the dataset of status information items acquired by the status information acquiring unit based on the specified time point when the malfunction started and the malfunction-cause-investigation information range determination table.

According to the aspect of the present invention, the controlling unit determines a time point when the malfunction started, and further determines the malfunction-cause-investigation information based on the malfunction-cause-investigation information range determination table describing a range of malfunction-cause-investigation information data specified based on when the malfunction started. Namely, the malfunction-cause-investigation information data are determined based on when the malfunction started specified. Therefore, by storing the determined malfunction-cause-investigation information data into the prescribed storage medium, it becomes possible to keep necessary information data to help for the diagnosis.

According to another aspect of the present invention, it may be preferable when the malfunction-cause-investigation information range determination table describes a range of malfunction-cause-investigation information data specified based on when the malfunction started, the range being determined based on the dataset of status information items acquired by the status information acquiring unit with respect to each type of malfunction, and the controlling unit determines the malfunction-cause-investigation information data to be used for investigating the cause of the malfunction based on the dataset of information items acquired by the status information acquiring unit by referring to the malfunction-cause-investigation information range determination table based on different criteria depending on a type of the malfunction.

By doing this, when the malfunction-cause-investigation information data to be used for investigating the cause of the malfunction is determined based on when the malfunction started, it becomes possible to differentiate the specified range depending on the type of the malfunction, thereby enabling further appropriately determining the necessary information data.

Further, according to another aspect of the present invention, the controlling unit may determine that a time point which is a prescribed time period before a time period when the dataset of status information items acquired by the status information acquiring unit has been maintained for a certain period of time is the time point when the malfunction started.

Further, according to another aspect of the present invention, a vehicle information storage apparatus may further include a temporary storage unit storing the dataset of status information items acquired by the status information acquiring unit. By having this, the controlling unit may determine the malfunction-cause-investigation information data from among the dataset of status information items stored in the temporary storage unit, and store the determined malfunction-cause-investigation information data into the prescribed storage medium by copying the determined malfunction-cause-investigation information data from the temporary storage unit to the prescribed storage medium.

Further, according to another aspect of the present invention, the dataset of status information items acquired by the status information acquiring unit may be successively stored in the prescribed storage medium, and the controlling unit may determine the malfunction-cause-investigation information data from among the dataset of status information items stored in the prescribed storage medium, and stores the malfunction-cause-investigation information data into the prescribed storage medium by deleting the determined malfunction-cause-investigation information data other than the determined malfunction-cause-investigation information data from the prescribed storage medium.

Effect of the Invention

According to an aspect of the present invention, a vehicle information storage apparatus may store necessary information dataset helpful for the diagnosis.

BRIEF DESCRIPTION OF THE DRAWINGS

FIG. 3 is a drawing showing the contents of a table 24C as an example.

EXPLANATION OF LETTERS AND NUMERALS

1: VEHICLE INFORMATION STORAGE APPARATUS
10: STATUS-INFORMATION-ACQUISITION SENSORS
20: ECU
24: ROM
24A,24B: PROGRAM
24C: TABLE
26: RAM
28: INTERNAL MEMORY
30: STORAGE MEDIUM
40: MULTIPLE COMMUNICATION LINES
50: IN-VEHICLE EQUIPMENT

BEST MODE FOR CARRYING OUT THE INVENTION

In the following, a best mode for carrying out an embodiment of the present invention is described with reference to the accompanying drawings.

[Embodiment ]

In the following, a vehicle information storage apparatus 1 according to an embodiment of the present invention is described. The vehicle information storage apparatus 1 monitors the data of the information items indicating the status of a vehicle including the in-vehicle equipment of the vehicle (hereinafter collectively referred to as a "vehicle") and stores the data of the information items indicating the status of the vehicle (hereinafter referred to as "malfunction-cause-investigation information") in a prescribed storage medium when a malfunction is detected in the vehicle based on the malfunction-cause-investigation information.

The vehicle information storage apparatus 1, may be included in a controlling device such as an ECU (Electronic Control Unit) performing various vehicle controls (such as engine control, brake control, steering control, and shift control), so that the controlling device performs the monitoring process and the storing processes of the vehicle information storage apparatus 1 while performing the primary processes of the controlling device. Otherwise, the vehicle information storage apparatus 1 may be provided as a dedicated apparatus functionally separated from the controlling device. In the following, it is assumed that the vehicle information storage apparatus 1 is configured to monitor the vehicle status and store the malfunction-cause-investigation information while performing the processes of the vehicle control.

[Configuration]

Figure 1:
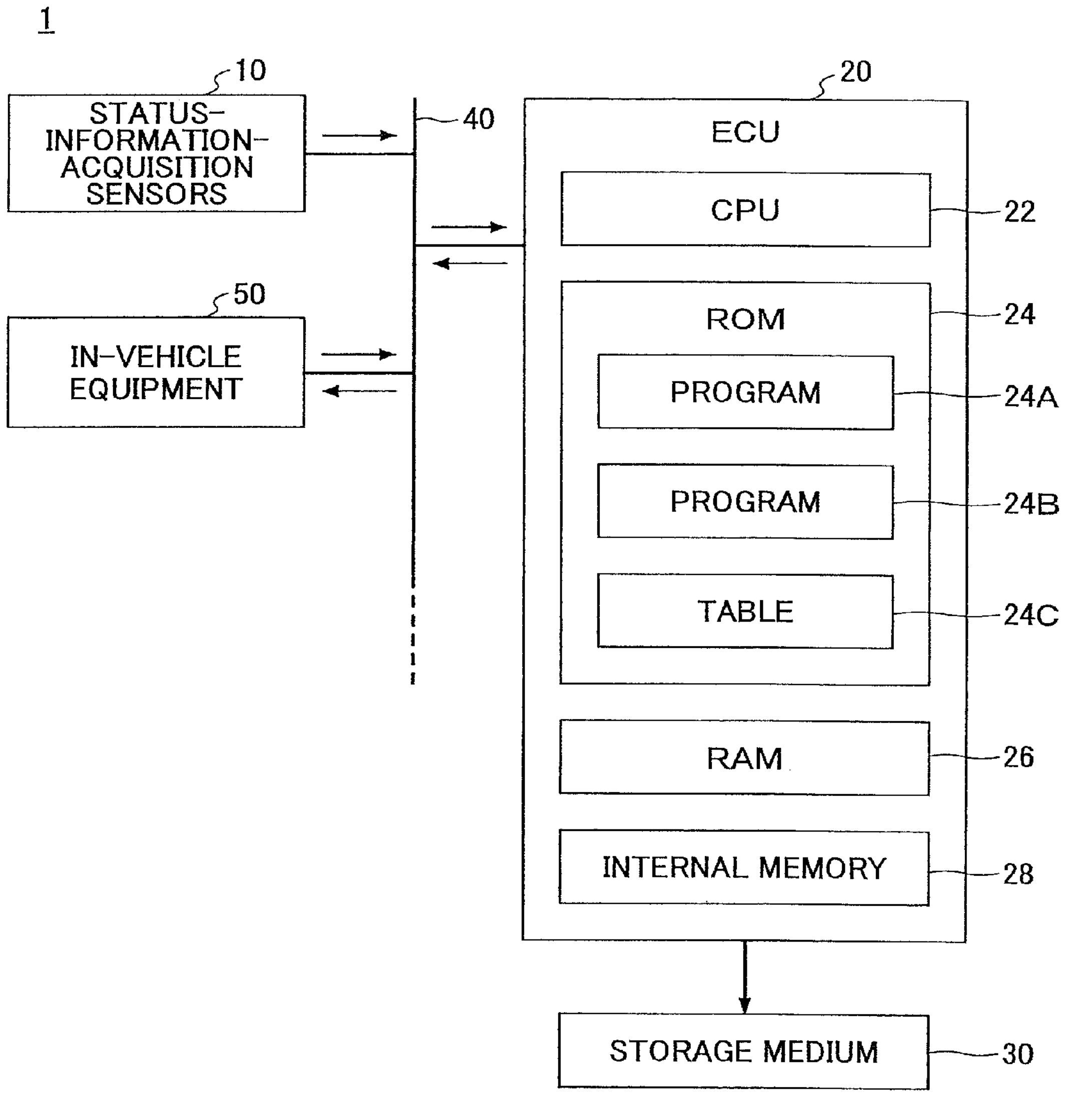
FIG. 1 is a drawing showing an example of a whole configuration of the vehicle information storage apparatus.

FIG. 1 shows an example of a whole configuration of the vehicle information storage apparatus 1. As shown in FIG. 1, the vehicle information storage apparatus 1 includes, as main components, status-information-acquisition sensors 10, an ECU 20, and a storage medium 30. The storage medium 30 stores the malfunction-cause-investigation information. The status-information-acquisition sensors 10 and the ECU 20 are connected to each other through a multiplex communication line(s) 40 and communicate with each other through CAN, BEAN, AVC-LAN or using an appropriate protocol such as FlexRay. It should be noted that this configuration is for explanation purposes only. For example, another configuration may be used in which the output values from the sensors are input into the ECU 20 through another ECU, a gateway computer, or the like.

The status-information-acquisition sensors 10 may include a water temperature sensor, various pressure sensors, a vehicle speed sensor, a voltage sensor, a G sensor, a yaw rate sensor, an accelerator opening sensor, a throttle opening sensor, and a shift position switch.

The ECU 20 may include a computer unit having a CPU (Central Processing Unit) 22 as the key component, a ROM (Read Only Memory) 24, and a RAM (Random Access Memory) 36, each connected with each other through a bus. The ECU 20 may further include an internal memory 28, I/O ports, a timer, and a counter, though those are not shown. The ROM 24 stores programs including a vehicle control program 24A, a vehicle-status-monitoring and data-storage program 24B, each executed by the CPU 22. The ROM 24 further includes a table 24C describing a range of the malfunction-cause-investigation information and criteria whether a malfunction starts, and other data. The content of the table 24C is described in detail below.

The ECU 20 is connected to in-vehicle equipment 50 to be controlled though the multiplex communication line(s) 40. The in-vehicle equipment 50 may include an actuator, an engine, a transmission (gear box), a brake device, and a steering device. For example, when the ECU 20 is provided mainly for the engine control, the equipment including a throttle motor, an igniter, and an injector may correspond to the in-vehicle equipment 50. Further, when the ECU 20 is provided mainly for the brake control, the equipment such as a brake actuator may correspond to the in-vehicle equipment 50. The description of controlling the in-vehicle equipment 50 by the ECU 20 is omitted herein because it is not a necessary part to describe the present invention.

In the storage medium 30, the malfunction-cause-investigation information data are finally stored. As the storage medium 30, an NVRAM (Non Volatile RAM) may be used in which, for example, an EEPROM (Electronically Erasable and Programmable Read Only Memory) and an SRAM (Static Random Access Memory) and a small battery embedded inside or provided outside the NVRAM are included. It should be noted that other storage mediums such as a flash memory, a magnetic disk, a magnetic tape, or a sheet (printing sheet) may also be used.

[Distinctive Process]

In the following, an exemplary process according to an embodiment of the present invention is described. In this case, the process is achieved by the execution of the program 24B in the ROM 24 by the ECU 20.

The data of status information items transmitted from the status-information-acquisition sensors 10 are stored in the RAM 26, the internal memory 28, and the like at a prescribed interval (for example, every several hundreds of milliseconds). It should be noted that the ECU 20 may extract the output values from the sensors at the prescribed interval, or each of the sensors may be arranged to output data in synchronization with the prescribed interval. In the description below, it is assumed that data are stored in the RAM 26, the internal memory 28, and the like every 0.5 seconds.

Figure 2:
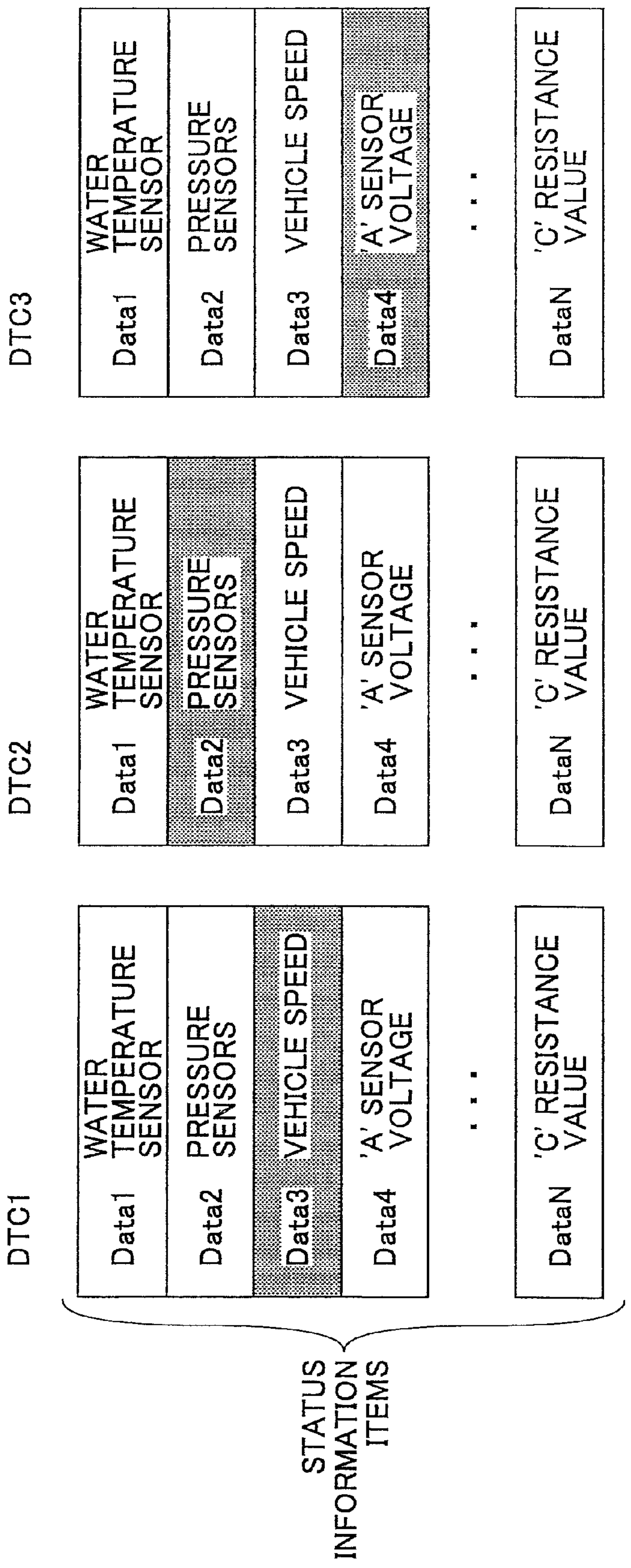
FIG. 2 is a schematic drawing showing where each DTC monitors a different information item.

The data of the status information items are transmitted from the status-information-acquisition sensors 10, and the ECU 20 monitors different information item(s) depending on the malfunction to be monitored. In the following, types of malfunction are referred to as "DTCs" (Diagnosis Trouble Codes). FIG. 2 shows a case where different status information items are monitored depending on each of the DTCs ("DTC1", "DTC2", and "DTC3" in the figure). As shown in FIG. 2, with respect to "DTC1", the item "vehicle speed" is mainly monitored to determine whether the malfunction of the "DCT1" is detected. In the same manner, with respect to "DTC2" and "DTC3", the items "pressures (fuel pressure and steam pressure)" and "'A' sensor voltage (voltage between the terminals of prescribed in-vehicle devices)" are mainly monitored to determine whether the malfunctions of the "DCT2" and "DTC3" are detected, respectively. It should be noted that only one or plural items may be monitored.

When, for example, any of the data of the items that is "mainly" monitored with respect to a DTC has been substantially constant (unchanged) for a prescribed time period, the ECU 20 determines that the malfunction of the DTC is detected. The "prescribed time period" with respect to each of the DTCs may be previously and separately determined, and the data of the "prescribed time periods" are stored in the ROM 24 as the data in the table 24C. FIG. 3 shows an example of the table 24C.

It should be noted that such determination may be made in real time with respect to the status information item(s) transmitted from the status-information-acquisition sensors 10 or may be made collectively every certain time period with respect to the time sequential data stored in the RAM 26, the internal memory 28, or the like.

Figure 4:
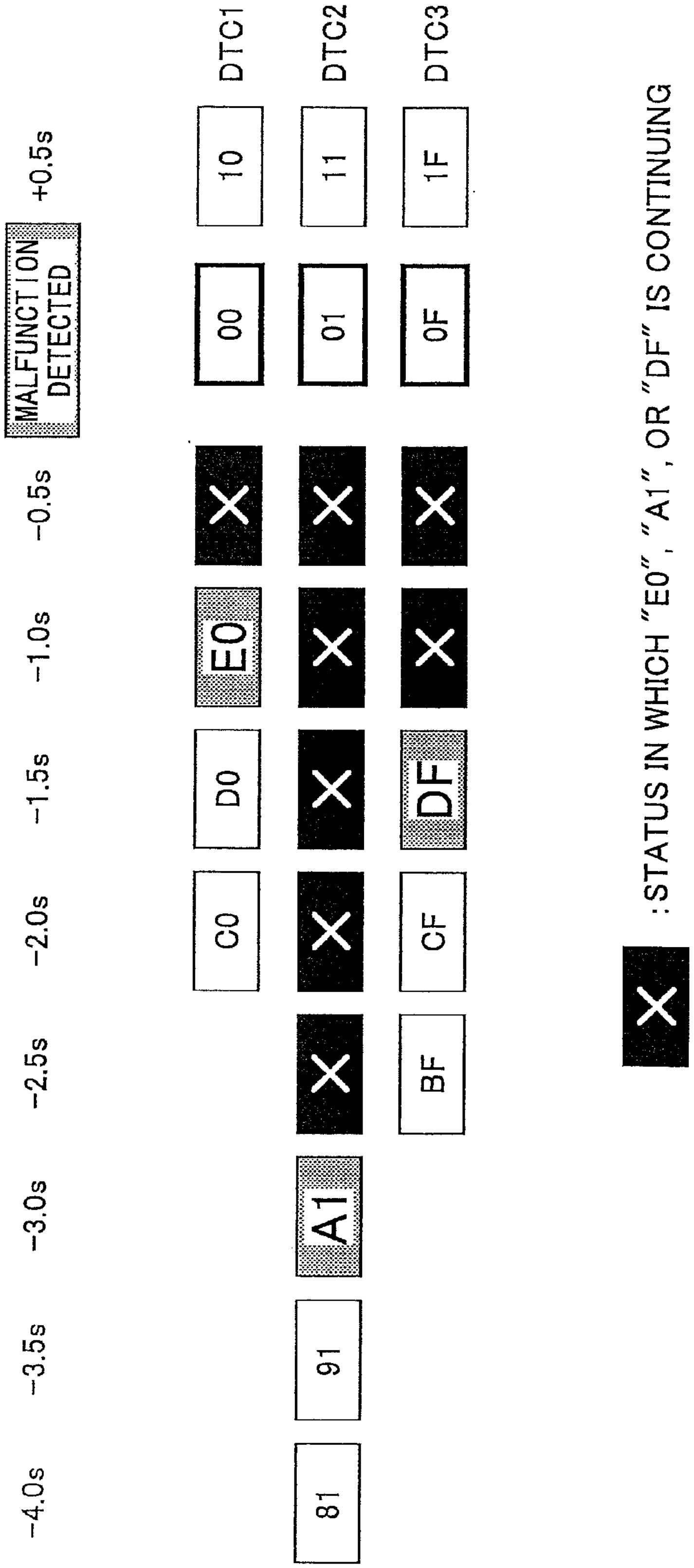
FIG. 4 is a drawing showing the time point when it is determined that a malfunction has started and the time point when the malfunction started.

FIG. 4 shows the time points when it is determined that the malfunction is detected and when the malfunction started with respect to each of the DTCs. As shown in FIG. 4, with respect to the "DTC1", at the time point when the status "E0" continues for one (1) second, it is determined that the malfunction is detected (namely, the malfunction has already started). Therefore, the time point which is one (1) second prior to the time point when it is determined that the malfunction has already started is determined as the time point when the malfunction started.

In the same manner, with respect to the "DTC2", at the time point when the status "A1" continues for three (3) seconds, it is determined that the malfunction has already started. Therefore, the time point which is three (3) seconds prior to the time point when it is determined that the malfunction has already started is determined as the time point when the malfunction started. With respect to the "DTC3", at the time point when the status "DF" continues for one and half (1.5) seconds, it is determined that the malfunction has already started. Therefore, the time point which is one and half (1.5) seconds prior to the time point when it is determined that the malfunction has already started is determined as the time point when the malfunction started. Each of the statuses (such as "E0", "A1", and "DF" in the above examples) that continues after the corresponding malfunction has started is specific to the corresponding DTC. It should be noted that FIG. 4 shows a case where each of the time points when the corresponding malfunctions are determined that the malfunctions have already started is the same with each other. However, this case is provided for illustrative purposes. Namely, in a practical case, each process of determining whether the corresponding malfunction has started is carried out independently.

Then, with respect to a DTC in which the malfunction of the DTC is determined to have been started and the time point when the malfunction started is specified, the ECU 20 determines a range of the malfunction-cause-investigation information from among the data of the status information items in the table 24C stored in the RAM 26, the internal memory 28, or the like. As shown in FIG. 3, the table 24C includes a column of the range of the malfunction-cause-investigation information indicating a time range from which second(s) before the malfunction started to which second(s) after the malfunction started, so that the data in the time range are stored in the storage medium 30. It should be noted that the terms "from which second(s) before the malfunction starts to which second(s) after the malfunction starts" is used for illustrative purposes only. For example, the time range may be described based on the number of data before the malfunction started and the number of data after the malfunction started.

It should be noted that when it is determined that the malfunction has been started, it is preferable to output an alarm using a prescribed HMI (Human Machine Interface). By doing this, the user may recognize the malfunction, so that the user can have the vehicle repaired by a dealer or the like. Then, at a repair site of the vehicle, the cause of the malfunction may be quickly determined by referring to the malfunction-cause-investigation information stored in the storage medium 30.

The ECU 20 extracts the data of the determined range as the malfunction-cause-investigation information from the RAM 26, the internal memory 28, or the like and stores (copies) the extracted data into the storage medium 30. As a result, each necessary information data between before and after the corresponding malfunction started may be stored into the storage medium 30, the information data being detected based on different criteria depending on the DTC. Further, as described above, the amount of data between before and after the each malfunction started to be stored may be determined by being previously described in the table 24C as appropriate values. By using this feature, it becomes possible to store and hold an appropriate amount of the data of the information items in the storage medium 30.

Next, a comparison is made with a conventional method of storing the data of information items. Conventionally, when it is determined that a malfunction is detected, each of the data of the information items is collectively stored, each of the data being in the same time range from a prescribed time period before a time point when the malfunction was detected to the time point when the malfunction was detected. However, the time period necessary to determine that the malfunction started may vary depending on a type of malfunction, and a necessary amount of data of the information items may also vary depending on a type of malfunction. As a result, when such conventional method is used, it is more likely to occur that the data in a necessary timing may not be stored and the data in unnecessary timing may be stored.

As is apparent from the comparison, the vehicle information storage apparatus 1 uses not the time point when it is determined that a malfunction has started but the time point when the malfunction started as a reference. By doing this, it may become possible to determine more appropriate malfunction-cause-investigation information. In addition, different methods of determining the range of the malfunction-cause-investigation information may be used among each of the malfunctions. Therefore, it becomes possible to determine each of the malfunction-cause-investigation information more appropriately. As a result, more necessary data of the information items for the subsequent diagnosis may be stored and held in the storage medium 30, thereby more directly contributing to the determination of the cause of the malfunction.

Further, the time required to copy data from the RAM 26, the internal memory 28, or the like to the storage medium 30 may be reduced. This is useful because, generally, a non-volatile storage medium requires more time to store data than the RAM 26 or the internal memory 28.

Further, the amount of data of the information items may be reduced. Accordingly, the capacity of the storage medium 30 may be reduced.

As described above, according to a vehicle information storage apparatus according to an embodiment of the present invention, more necessary information may be stored and held to help for the diagnosis

MODIFIED EXAMPLE

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

For example, in the above embodiment, it is assumed that the data of information items from the status-information-acquisition sensors 10 are once stored in the RAM 26, the internal memory 28, or the like, and only the data selected from the stored data based on the above-described method are copied into the storage medium 30. However, the present invention is not limited to this. For example, the data of information items from the status-information-acquisition sensors 10 may be directly stored in the storage medium 30, and the data other than the data determined based on the above-described method may be deleted from the storage medium 30.

Further, as a method of determining that a malfunction has started, one method is described in the above embodiment. However, the present invention is not limited to the method. For example, when a specific data change is known to be observed in a part or all of the data of the information item(s) from the status-information-acquisition sensor(s) 10 before and after the time point when a malfunction starts, it may become possible to determine that the malfunction has started and the time point when the malfunction started based on the observed data change.

Further, the table 24C may describe only the item "criteria for determining whether a malfunction started". In this case, the common data of "from which second(s) before the malfunction started to which second(s) after the malfunction started" or "the number of data before the malfunction stared and the number of data after the malfunction started" may be used for each of the DTCs as the data of the item "range of the malfunction-cause-investigation information" regardless of a type of the malfunction.

INDUSTRIAL APPLICABILITY

The present invention may be applied to a vehicle manufacturing industry and a vehicle parts manufacturing industry.

The present application claims priority from Japanese Patent Application No. 2007-320992 filed on Dec. 12, 2007, the entire contents of which are hereby incorporated herein by reference.

The invention claimed is:

1. A vehicle information storage apparatus comprising:

a status information acquiring unit configured to acquire a dataset of status information items of a vehicle;

a controlling unit configured to acquire malfunction-cause-investigation information data to be used for investigating a cause of a malfunction based on the dataset of information items acquired by the status information acquiring unit, and to store the determined malfunction-cause-investigation information data in a prescribed storage medium; and a malfunction-cause-investigation information range determination table configured to specify a determination condition to determine an occurrence of a malfunction and a start recording time and a stop recording time of a recording range of the malfunction-cause-investigation information data which are before and after a time when the malfunction started based on the time when the malfunction started with respect to each type of malfunctions, wherein the controlling unit is configured to determine a time point when the malfunction started in the vehicle based on the dataset of status information items acquired by the status information acquiring unit and the determination condition to determine the occurrence of the malfunction specified by the malfunction-cause-investigation information range determination table, and further determine the malfunction-cause-investigation information data to be used for investigating the cause of the malfunction from among the dataset of status information items acquired by the status information acquiring unit based on the specified time point when the malfunction started and the start recording time and the stop recording time of the recording range of the malfunction-cause-investigation information data specified by the malfunction-cause-investigation information range determination table.

2. The vehicle information storage apparatus according to claim 1, wherein the controlling unit is configured to determine that a time point which is a prescribed time period before a time period when the dataset of status information items acquired by the status information acquiring unit has been constant for a certain period of time is the time point when the malfunction started.

3. The vehicle information storage apparatus according to claim 2, further comprising:

a temporary storage unit configured to store the dataset of status information items acquired by the status information acquiring unit, wherein the controlling unit is configured to determine the malfunction-cause-investigation information data from among the dataset of status information items stored in the temporary storage unit, copy the determined malfunction-cause-investigation information data from the temporary storage unit to the prescribed storage medium, and store the determined malfunction-cause-investigation information data into the prescribed storage medium.

4. The vehicle information storage apparatus according to claim 2, wherein the dataset of status information items acquired by the status information acquiring unit are successively stored in the prescribed storage medium, and wherein the controlling unit is configured to determine the malfunction-cause-investigation information data from among the dataset of status information item stored in the prescribed storage medium, delete the determined malfunction-cause-investigation information data other than the determined malfunction-cause-investigation information data from the prescribed storage medium and store the malfunction-cause-investigation information data into the prescribed storage medium.

5. The vehicle information storage apparatus according to claim 1, further comprising:

a temporary storage unit configured to store the dataset of status information items acquired by the status information acquiring unit, wherein the controlling unit is configured to determine the malfunction-cause-investigation information data from among the dataset of status information items stored in the temporary storage unit, copy the determined malfunction-cause-investigation information data from the temporary storage unit to the prescribed storage medium, and store the determined malfunction-cause-investigation information data into the prescribed storage medium.

6. The vehicle information storage apparatus according to claim 1, wherein the dataset of status information items acquired by the status information acquiring unit are successively stored in the prescribed storage medium, and wherein the controlling unit is configured to determine the malfunction-cause-investigation information data from among the dataset of status information items stored in the temporary storage unit, delete the determined malfunction-cause-investigation information data other than the determined malfunction-cause investigation information data from the prescribed storage medium, and store the malfunction-cause-investigation information data into the prescribed storage medium.

* * * * *